United States Patent Office 3,040,917
Patented June 26, 1962

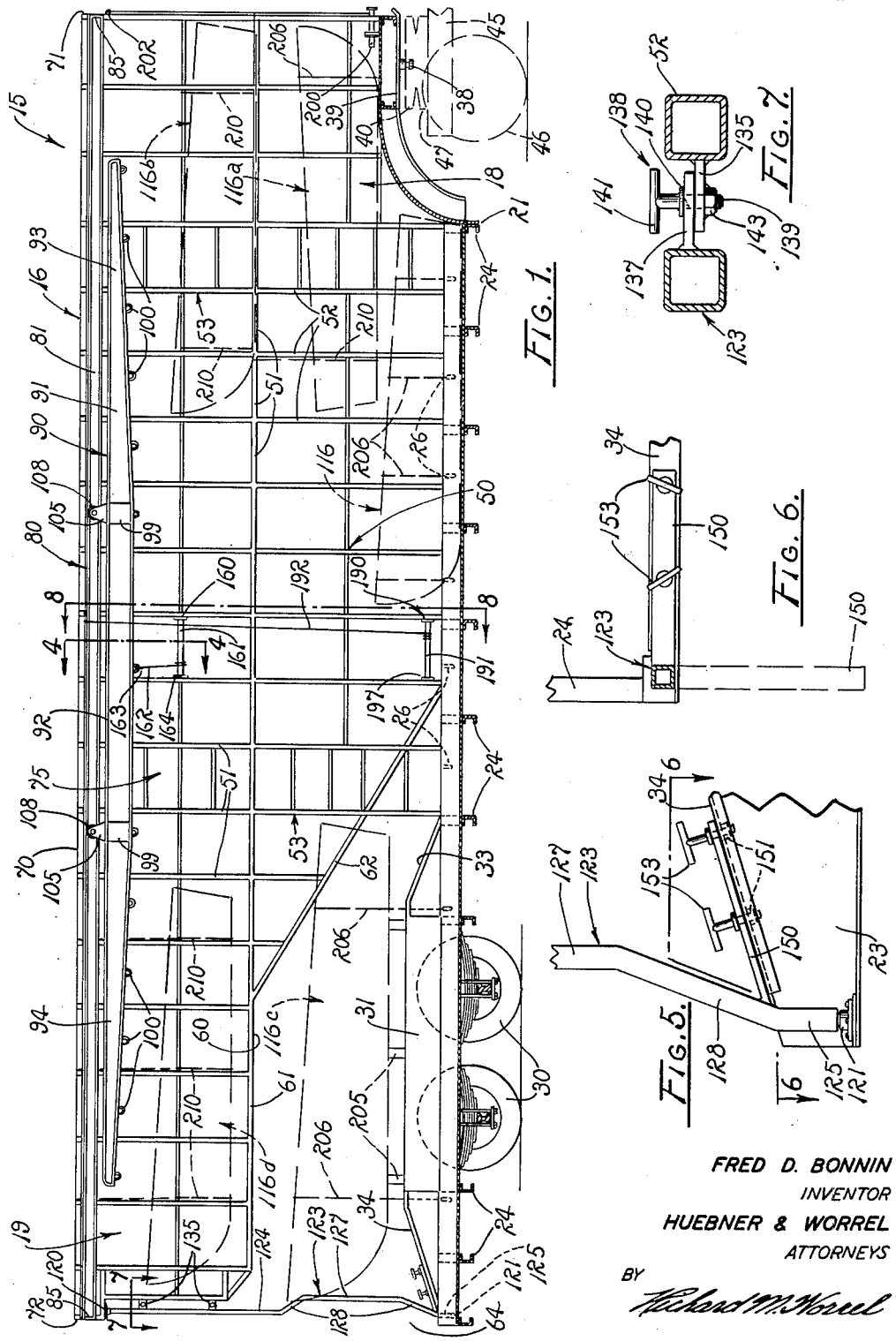

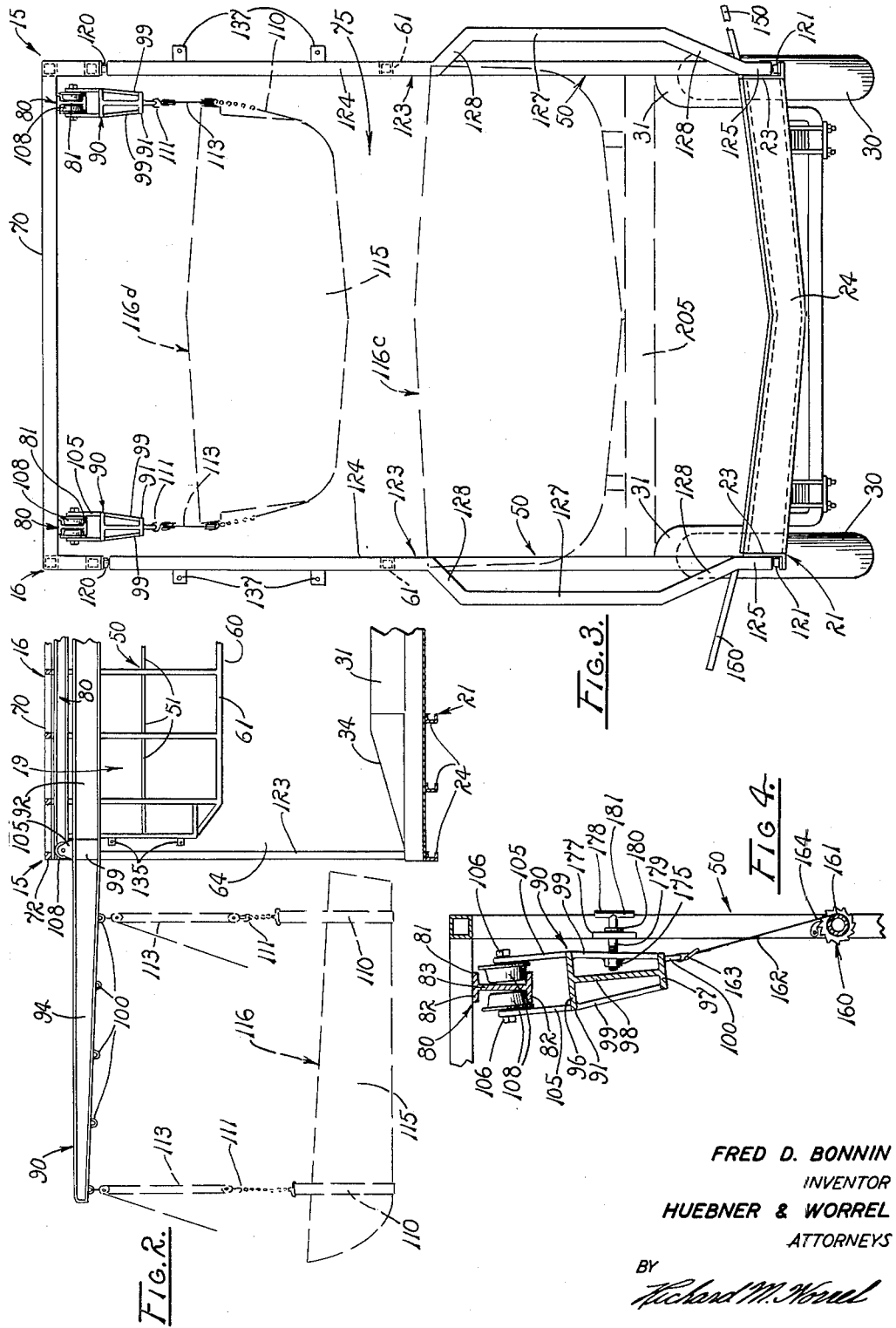

3,040,917
LOAD TRANSPORTING VEHICLE
Fred D. Bonnin, P.O. Box 10, Malaga, Calif.; Bertha Bonnin, administratrix of said Fred D. Bonnin, deceased
Filed Feb. 8, 1960, Ser. No. 7,375
10 Claims. (Cl. 214—75)

The present invention relates to a load transporting vehicle, and, more particularly, to such a vehicle having provision for the convenient loading and unloading of bulky objects, such as boat hulls and the like.

As is well-known, it is conventional to carry small groups of automobiles in so-called autotransports. Such conveyance is normally practiced from the manufacturers to distributors and from distributors to dealers. A conventional autotransport usually includes a tractor truck and a trailer adapted to contain or support the automobiles being transported. Ramps are provided for driving the automobiles from the ground onto the trailer, and vice versa.

It is also desirable to transport boats in the same manner. However, conventional autotransports are not suitable for carrying boats inasmuch as boats have no provision for being rolled from place to place and must be lifted.

Accordingly, it is an object of the present invention to provide a mobile vehicle for transporting a plurality of boats and other objects which has provision for loading and unloading such objects.

Another object is to provide such a vehicle incorporating loading and unloading means having special applicability to the loading and unloading of bulky loads.

Another object is to provide a mobile boat carrier or transport.

Another object is to load, transport, and unload boats in a dependable manner and with a minimum of damage thereto.

Another object is to provide a boat carrier which is adapted to accommodate boats of greater widths than normally can be received by vehicles intended for highway travel.

Another object is to provide a mobile vehicle having a loading and unloading carriage which can be locked in immovable position during earth-traversing movement of the vehicle.

Another object is to provide a carrier of the type described which can be loaded and unloaded from both ends.

These, together with other objects, will become more fully apparent upon reference to the following description and accompanying drawings.

In the drawings:

FIG. 1 is a longitudinal, vertical section of a vehicle embodying the principles of the present invention and showing a plurality of boats, in dashed lines, loaded within the vehicle.

FIG. 2 is a fragmentary, rear elevation of the vehicle of FIG. 1 but showing a carriage extended outwardly through the rear open end of the carrier housing in a position for loading or unloading a boat, shown in dashed lines.

FIG. 3 is a somewhat enlarged, rear elevation of the vehicle illustrated in FIG. 1 but showing gate posts at the rear of the vehicle in loading and unloading position and with boats shown in dashed lines in transporting positions.

FIG. 4 is a somewhat enlarged, fragmentary transverse vertical section taken on line 4—4 in FIG. 1.

FIG. 5 is a somewhat enlarged, fragmentary side elevation of a rear portion of the subject vehicle and particularly showing one of the gate posts locked in transporting position.

FIG. 6 is a horizontal section taken on line 6—6 in FIG. 5 but showing the loading and unloading position of the post in dashed lines.

FIG. 7 is a somewhat enlarged, horizontal section taken on line 7—7 in FIG. 1.

Figure 8:
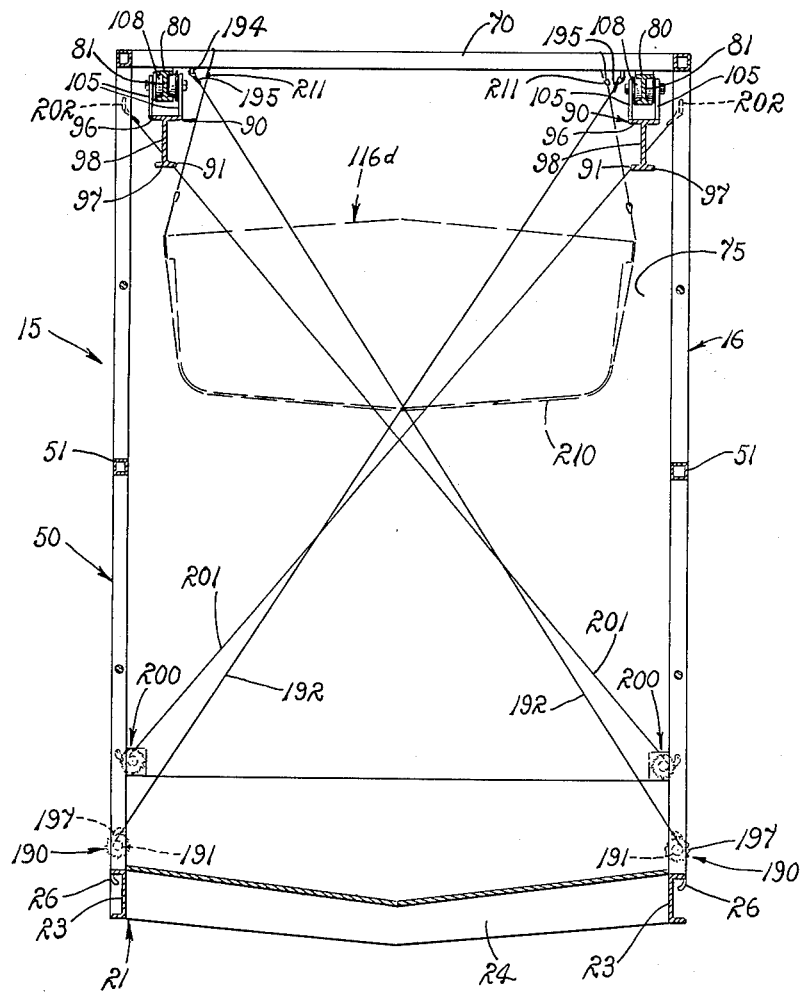
FIG. 8 is a somewhat enlarged transverse section of the vehicle taken on line 8—8 in FIG. 1 but with only one boat shown in dashed lines.

Referring more particularly to the drawings, a trailer embodying the principles of the subject carrier is generally indicated by the numeral 15 in FIGS. 1, 2, 3, and 8. The trailer includes an elongated housing 16 having a forward end portion 18, and a rearward end portion 19. The housing has a substantially horizontal lower chassis 21 including a pair of channel-shaped longitudinally extended side members 23 rigidly interconnected by V-shaped transverse members 24 constituting a bed for the trailer. With particular reference to FIG. 3, it is to be noted that the transverse members are of the same angularity longitudinally of the housing and provide lower apices aligned longitudinally of the housing. Rope hooks 26 are connected to the side members in longitudinally spaced relation therealong.

A plurality of rear ground wheels 30 support the rearward end portion 19 of the housing 16 for earth-traversing movement, in a well-known manner. Fenders 31 are extended over the rear wheels on opposite sides of the chassis 21 and include forwardly and rearwardly sloped portions 33 and 34, respectively, in front of and at the rear of the wheels. A kingpin 38 is extended downwardly from an arcuate wheel plate 39 at the forward end portion 18 of the chassis 21, and an upper fifth wheel 40 is supported by the kingpin in a conventional manner.

A very small portion of a tractor truck, or other draft vehicle, is generally indicated by the numeral 45 and is shown in dashed lines in FIG. 1. This truck includes ground wheels 46 and a lower fifth wheel 47 associated with the upper fifth wheel 40 on the trailer 15 in a well-known manner forming no part of the present invention.

The housing 16 also includes a pair of transversely spaced, latticed side walls 50 individually rigidly upwardly extended from the longitudinal side members of the chassis 21. The side walls include a plurality of horizontal members 51 interconnected by vertical members 52. It is to be noted that these horizontal and vertical members provide front and rear ladders 53 in each side wall and in longitudinally spaced relation to each other relatively adjacent to the forward and rearward end portions 18 and 19 of the housing. The particular construction of the side walls of the housing is not critical but it is preferred that the open frame type of construction illustrated be employed.

It is significant, however, that each of the side walls 50 provides a side opening 60 at the rearward end portion 19 of the housing 16. One of the horizontal members 51 of each side wall includes a rear end portion 61, and each side wall has a rear inclined member 62 downwardly forwardly extended from said rear end portion transversely of the rear ladder and connected to the chassis 21. Accordingly, on each side wall, said rear end portion 61, the inclined member, the fender 31, and the portion of the chassis between the fender and the inclined member circumscribe the side opening in such side wall. Each side opening has a rear mouth 64 opening rearwardly of the housing. It is, of course, evident that each side opening is in a common plane with its side wall.

The housing 16 further includes a roof 70 rigidly interconnecting the side walls 50 in elevationally spaced, substantially parallel relation to the chassis 21. The roof has a transverse forward edge 71 and a transverse rear edge 72 terminating at the extreme forward and rearward end portions 18 and 19 of the housing. It is to be noted that the housing provides a compartment, generally identified by the numeral 75, and circumscribes opposite, open ends at the forward and rearward end portions of the housing.

A track 80 includes a pair of elongated rails 81 rigidly connected to the roof 70 of the housing 16 in transversely spaced relation and extended longitudinally thereof respectively adjacent to the opposite side walls 50, as best seen in FIG. 3. Each rail has a pair of spaced horizontal flanges 82 interconnected by a vertical flange 83. Also, end webs 85 are connected to opposite ends of the vertical and horizontal flanges and are generally coincident with the opposite forward and rearward edges 71 and 72 of the roof.

An elongated carriage 90 includes a pair of elongated beams 91 having intermediate portions 92 and opposite forward and rearward end portions 93 and 94, as best seen in FIG. 1. Further, each beam has a substantially horizontal top flange 96, and a bottom flange 97 which is parallel to the top flange along the intermediate portion of the beam and convergently upwardly extended toward the top flange at the end portions of the beam. Each beam has a vertical central flange 98, and side flanges 99 rigidly interconnect the top and bottom flanges of each beam in longitudinally spaced relation along the intermediate portions thereof, as illustrated in FIG. 1. Also, a plurality of eyelets 100 are secured to the bottom flanges 97 of the beams in a pair of transversely spaced, longitudinally extended rows so that there are corresponding, transversely aligned, eyelets on opposite beams.

Pairs of transversely spaced plates 105 are rigidly upwardly extended from the intermediate portions 92 of the beam 91 approximately at the location of the side flanges 99. The pairs of plates on each beam are in longitudinally spaced relation to each other, as viewed in FIG. 1, but the plates of each pair are transversely spaced from each other a distance slightly greater than the width of the horizontal flanges 82 of the rails 81, as seen in FIG. 4. Thus, the plates are extended upwardly on opposite sides of the rails. Axle pins 106 are mounted in each pair of plates in axial alignment, and rollers 108 are journaled on the pins and are in rollable engagement with the lower horizontal flanges 82 of the rails. Each beam is thus supported on its respective rail by longitudinally spaced, forward and rearward pairs of rollers, constituting dollies, with the rollers in each pair being transversely spaced from each other, and the carriage 90 is supported on the track 80 for movement longitudinally of the housing 16. It is to be noted that the overall length of the beams 91 is less than the overall length of the housing but greater than half the length of the housing so that when the carriage is positioned entirely within the housing, the end portions of the beams are inwardly spaced from the opposite end edges 71 and 72. However, the carriage is movable between opposite endmost positions wherein the rollers 108 are respectively in engagement with the webs 85 at opposite ends of the track 80 thereby limiting endward movement of the carriage on the track. In either endmost position of the carriage, the forward and rearward end portions 93 and 94 of the beams respectively extend outwardly through the forward and rearward open end portions 18 and 19 of the housing. In FIG. 2, the rearward end portions 94 of the beams 91 are extended outwardly through the opening at the rearward end portion of the housing, and the carriage is in its rearwardmost position.

Forward and rearward pairs of slings 110 include opposite end hooks 111 and flexible intermediate arcuate portions 112. Block and tackle units 113 releasably individually interconnect the hooks of the slings and the eyelets for enabling elevationally adjustable movement of the slings relative to the carriage. It is to be understood that the slings are suspended by and under the carriage transversely of the housing. Also, the forward pair of slings is connected in longitudinally spaced relation to the forward end portions 93 of the beams 90 while the rearward pair of slings is connected in longitudinally spaced relation to the rearward end portions 94. The intermediate portions of the slings are adapted to extend under the hull 115 of a boat, as 116, for supporting the boat on the carriage, as seen in FIG. 2.

With particular reference to FIGS. 1, 3, 5, 6, and 7, pairs of upper and lower bearings 120 and 121, respectively, are mounted on the side walls 50 of the housing 16 at the rearward end portions 19 thereof. The upper and lower bearings in each pair are in vertical alignment and are in a common plane with their respective side walls of the housing. Elongated, upright gate posts 123 include vertically aligned straight, upper and lower end sections 124 and 125, respectively, straight intermediate offset sections 127 parallel to the upper and lower end sections, and oblique transitional sections 128 interconnecting the intermediate and end sections in integral relationship. Each post is rotatable in its bearings about a vertical axis defined by the aligned end sections, said axis being in the plane of its respective side wall, between a boat loading and unloading position, illustrated in FIG. 3, with the offset section extended laterally outwardly substantially normally of the side wall, and a boat transporting position, illustrated in FIG. 1, with said offset section extended forwardly of the housing and with the intermediate and transitional sections in the plane of their respective side wall of the housing. It is thus evident that when both of the posts are in boat unloading and loading positions, the spacing between the offset sections of the post, measured in a horizontal plane transversely of the housing, is greater than the spacing between the side walls of the housing. When both of the posts are in boat transporting position, the lateral distance between the offset sections is substantially equal to the distance between the side walls. The significance of the gate posts and the positions thereof will be evident hereinafter.

Upper and lower housing ears 135 are rigidly rearwardly extended from the rearward end portion 19 of each side wall 50 of the housing 16. Upper and lower post ears 137, corresponding in vertical positions to the upper and lower housing ears, are radially extended from the upper end sections 124 of the gate posts 123 so that when the posts are in transporting positions, the post ears individually overlap the housing ears. As best illustrated in FIG. 7, bolts 138 provide shanks 139 releasably extended through apertures in the overlapped ears, disks 140 secured to the shanks and engaging the post ears with the shank extended in said apertures, and handles 141 connected to the shanks. Nuts 143 are welded on the housing ears and screw-threadably receive the shanks. In this manner the posts are releasably held in transporting position but, on removal of the bolts, are easily moved into their boat loading and unloading positions.

Also, locking plates 150 are obliquely upwardly angularly extended from the lower end sections 125 of the posts 123 and overlap the rear portions 34 of the fenders 31 in said boat transporting positions of the posts. Nuts 151 are welded underneath the rear portions of the fenders in alignment with apertures in the fenders. Bolts 153, similar to the bolts 138, provide shanks extended through the locking plates and the apertures in the fenders, are and releasably screw-threadably received in the nuts in the fenders. The locking plates and bolts thus dependably hold the lower end sections of the posts in boat transporting positions.

With reference to FIGS. 1 and 4, carriage retaining winches 160 are supported in the side walls 50 of the housing 16 intermediate the forward and rearward end portions 18 and 19 and below the intermediate portions 92 of the beams 90 on their respective sides of the housing 16 when the beams are centered in the housing. Each winch includes a horizontal spool 161 in the plane of its respective side wall, a cable 162 having an inner end connected to the spool, an outer end, and a hook 163 attached to the outer end of the cable. A ratchet 164 is mounted on the side wall in operable association with the spool of the winch and, when engaged, is adapted to limit unwinding of the spool. A crank, not shown, is provided for rotating the spool thereby to wind or unwind the cable around the spool or controllable to allow the cable to play out from the spool when the ratchet is released.

Referring to FIG. 4, nuts 175 are secured, as by welding, to the inside surface of the outer side flanges 99 on the carriage beams 91. Carriage locking plates 177 are secured to each side wall 50 generally in the plane of their respective side walls and directly above the retaining winches 160 at their respective sides of the housing. Elongated bolts 178 include shanks 179 having screw-threaded ends extended through the locking plates, and disks 180 are connected to the shanks for engagement with the plates. Handles 181 are provided on the shanks for rotating the same.

A pair of lower, central, transverse, bracing winches 190 include spools 191 connected between a pair of vertical side wall members 52 adjacent to the chassis 21 and intermediate the forward and rearward end portions 18 and 19 thereof. Spools are rotatable on horizontal axes extended longitudinally of the chassis in the planes of their respective side walls 50. The winches also include cables 192 having inner ends individually connected to the spools and outer ends adapted to extend diagonally upwardly within the housing 16. Eyelets 194 are connected to the roof 70 adjacent to the side walls, and hooks 195 are attached to the outer ends of the cables for releasable connection to the eyelets when the cables are extended diagonally in crossed relation within the housing, as illustrated in FIG. 8. The winches include cranks, not shown, for rotating the spools to play out or take up the cables, and releasable ratchets 197 for precluding unwinding rotation of the spools.

End bracing winches 200 are provided at the forward end portion 18 of the housing 16 and have cables 201 releasably interconnecting the side walls 50 adjacent to the chassis 21 and the opposite side walls adjacent to the roof 70 in a manner similar to the central bracing winches 190 and believed evident by reference to FIG. 8. Eyelets 202 are provided on the side walls adjacent to the roof and to which the latter cables are connected. The bracing winches 190 and 200 are provided at other positions longitudinally of the housing than the positions illustrated and described, if necessary, or additional bracing winches, not shown, are employed.

*Operation*

The operation of the described embodiment of the subject invention is believed to be readily apparent and is briefly summarized at this point. The trailer 15 can house various numbers and types of objects, such as the boats 116, depending on the relative sizes of such objects, the size in which the trailer is constructed, this frequently being limited by statute, and the manner in which the objects are placed in the housing. For purposes of illustration, however, five boats are shown loaded in the housing 16. To facilitate discussion of the relative positions of the boats, they are hereinafter individually referred to as boats 116, 116a, 116b, 116c, and 116d.

Assuming that the housing 16 is initially empty and that it is desired to load the boat 116 into the housing through the rear end opening, the bracing cables 192 and 201 are disconnected from the roof 70 and side walls 50 and are wound on their respective spools 191 and 200 so as to eliminate interference by the cables with movement of the boats longitudinally of the housing. The carriage 90 is manually moved rearwardly to its rearwardmost position, as illustrated in FIG. 2, with the rearward pair of slings 110 suspended outwardly of the housing. The slings are lowered by the block and tackle units 113 and are positioned around opposite ends of the first boat 116 to be loaded.

The boat 116 is lifted on the carriage 90 by means of the block and tackle units 113. The carriage is moved forwardly in the housing 16 to its forwardmost position with the forward rollers 108 engaging the forward end webs 85. The boat 116 is then lowered on the chassis 21. It is to be noted that the boat is initially located in a temporary position approximately in the center of the chassis between the forward and rearward end portions 18 and 19.

The carriage 90 is then moved rearwardly again until the forward pair of slings 110 is above the boat 116. These slings are lowered on the carriage by means of the interposed block and tackle units 113, and the slings are extended around said boat. The boat 116 is again lifted and the carriage moved forwardly until the boat is located forwardly within the housing 16 preferably with the stern above the rear end of the wheel plate 39. The boat 116 is lowered onto the chassis 21 so that the stern thereof abuts the forward arcuate portion of the chassis above the rear end of the wheel plate and, thereafter, the slings are removed. Ropes 206 are extended over the boat 116, extended through or around, or otherwise connected to, hardware, not shown, on the boat, and connected to the rope hooks 26 on opposite sides of the boat thereby securely lashing the boat to the chassis and precluding longitudinal, transverse, or elevational movement of the boat relative to the chassis.

The next boat 116a to be loaded is picked up by the carriage 90 at the rear of the trailer in a similar manner, is moved into the housing 16 and is lowered onto the chassis 21 in an initial temporary position just rearwardly of the boat 116. The carriage is thereafter moved rearwardly and the boat 116a is picked up by the forward pair of slings 110 and moved forwardly in the housing to a position above and slightly forwardly of the boat 116. The boat is lowered until the bow rests on the forward arcuate portion of the chassis above the wheel plate 39. Before removing the boat from the slings, a strap 210 is extended underneath the stern and provides opposite ends 211 hooked to horizontal side members 51 of opposite side walls 50 of the housing. The bow of the boat 116a is also lashed to the chassis by ropes 206, as previously described.

The boat 116b is loaded into the housing 16 above the boat 116a in the same manner as the boat 116a. However, straps 210 are extended underneath the boat 116b and connected to the side walls for suspending the boat 116b above the boat 116a.

The foregoing discussion of the operation of the subject trailer 15 assumes that each of the boats 116, 116a, and 116b is narrower than the width of the trailer 15, that is, the minimum transverse dimension between the side walls 50. However, the subject trailer is adapted to accommodate at least one boat 116c of a width greater than the spacing between the side walls. In order to load such a boat, the posts 123 are rotated into their boat loading and unloading position so that the distance between the offset portions 127 is greater than the distance between the side walls. This allows a boat wider than the distance between the walls to be loaded into the trailer by means of the carriage 90 and between the offset portions of the posts. Further, the side openings 60 allow forward movement of the boat over the chassis 21. When the bow of such boat is in inwardly spaced relation to the rearward end opening of the trailer, the boat is lowered onto a plurality of support members 205 extended transversely of the trailer and rested on the fenders 31. As before, ropes 206 are employed for lashing the boat 116c to the chassis. The posts are then returned to their transporting positions and locked therein by threading bolts 138 and 153 into their respective nuts 143 and 151. This, of course, prevents rearward movement of the boat 116c outwardly through the rear opening of the trailer.

The boat 116d is loaded in a manner similar to boat 116b but remains at the upper, rearward end portion of the trailer 15. Straps 210 are also used for supporting the boat 116d in the rear end portion of the housing. It is to be understood that, if required, ropes, as 206, may be employed for additionally lashing the boats 116a, 116b, and 116c to the housing to minimize their swaying or other movement during travel.

After all of the boats 116, 116a, 116b, 116c, 116d, and such others as may be desired have been loaded into the trailer 15, the carriage 90 is moved to a position centrally of the housing 16. As shown in FIG. 4, the hooks 163 are connected to the central eyelets 100 on each beam 91 of the carriage, the ratchets 160 are engaged, and the spools 161 are turned to wind in their respective cables 162. This pulls the beams laterally outwardly toward their respectively adjacent side walls 50. The bolts 178 are then screw-threaded into their respective nuts 175 to lock the carriage in its central position and to preclude longitudinal rolling or transverse swinging movement of the carriage on the track 80 particularly during earth-traversing movement of the carrier.

Also, the cables 192 and 201 are connected to their respective eyelets 195 and 202, and the winches 190 and 200 are adjusted to tighten these cables; their associated ratchets are engaged to maintain the cables under tension so as to impart transverse rigidity to the housing 16. The ladders 53 are employed by workmen for effecting connection or disconnection of the various hooks and eyelets described above.

With the trailer 15 loaded in the manner described, it is ready for transport. The trailer is pulled by means of a tractor-trailer, generally indicated by the numeral 45. When the trailer reaches its destination, the cables 162 and 192 are disconnected. It is believed evident that the boats are removed from the compartment 75 of the housing 16 by following a reverse procedure from that described above in connection with loading of the trailer. Although the operation has been described with loading and unloading effected through the rear opening of the housing, it is to be understood that boats can be loaded or unloaded through the forward opening in the same manner. In this event, of course, the forward bracing cables 201 are disconnected during the loading or unloading operation.

From the foregoing, it will be evident that a mobile carrier for transporting objects which lack support for independent earth-traversing movement, has been provided. The carrier loads and unloads the vehicles to be transported by means of a carriage movable longitudinally of the carrier. It is significant that boats are loaded, transported, and unloaded with care so as to minimize surface abrasions, and other damage. Locking of the carriage during transport is of aid in this respect. Although the carrier provides a compartment which is substantially unobstructed during loading and unloading for enabling movement of the vehicles to be carried along the full length of the compartment, and to be raised and lowered in upper and lower tiers, releasable tensioned cables provide transverse bracing for the housing. The carrier is suited for transporting objects, such as boats, of greater width than the normal internal width of the trailer and for conveniently loading and unloading the same from either end.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A load transporting vehicle comprising an elongated housing of rectangular cross-section having first and second open ends leading into a compartment therein and having pair of spaced upright side walls, a top structure, and means mounting the housing for earth-traversing movement; an elongated track supported in the housing from said top structure and extended longitudinally thereof; an elongated carriage having first and second opposite end portions and being supported on the track for movement in opposite directions longitudinally of the housing, the track and carriage having engageable means limiting movement of the carriage on the track at said ends of the housing with said first and second end portions being alternately and oppositely extendable out of the open first and second ends of the housing respectively and retractable therein, a first pair of hoist slings connected to said first end portion of the carriage and suspended transversely of the housing for supporting an object on the carriage to load or unload the object; a second pair of hoist slings connected to said second end portion of the carriage and suspended transversely of the housing for supporting an object on the carriage to load or unload the object; said first pair of hoist slings having a path of travel extending from a position beyond said first open end of the housing to a position in said housing short of said second open end, and said second pair of hoist slings having a path of travel extending from a position beyond said second open end to a position in said housing short of said first open end.

2. The vehicle of claim 1 wherein tension members are extended diagonally of the housing in intersecting relation and have opposite ends releasably connected to the housing for transversely bracing the housing after loading, and ratchet means mounted on said side walls engageably maintaining the tension members between taut and relaxed positions alternately blocking and opening said compartment in the housing.

3. A vehicle comprising an elongated housing of predetermined length having opposite open ends and providing a vehicle compartment therein; means mounting the housing for earth-traversing movement; an elongated track supported in the housing and extended longitudinally thereof; and an elongated carriage having a length shorter than the length of the housing supported on the track for movement in opposite directions longitudinally of the housing toward opposite ends of the housing, the track and carriage having engageable means limiting movement of the carriage on the track at opposite ends of the housing, and the carriage having oppositely extended end portions respectively extendible out of the open ends of the housing and said carriage is at opposite ends of the housing; and a winch borne by the housing intermediate the ends thereof, the winch having a cable releasably connected to the carriage when the latter is located entirely within the compartment and intermediate its positions at opposite ends of the housing, the winch including a spool to which the cable is connected for winding the cable inwardly to pull the carriage laterally of the housing, and including means releasably rigidly interconnecting the housing and carriage to preclude movement of the carriage longitudinally and laterally of the housing.

4. A load transporting vehicle comprising an elongated housing adapted for earth-traversing movement and including opposite upstanding sides in predetermined, transversely spaced relation to each other, and an open end between the sides leading into a compartment within the housing; a carriage mounted in the housing for movement longitudinally of the compartment for loading an object from exteriorly of the housing into the housing through said open end, one of the sides of the housing providing an opening therein, said opening having a mouth at the open end of the compartment and being extended inwardly of the side from said mouth, said opening being adapted to accommodate an object wider than the spacing between the sides; and an elongated gate member mounted on one side of the housing, in transversely spaced relation to the other side thereof, adjacent to said open end, and in spanning relation to the mouth of the opening for movement between a loading position spaced from said other side of the housing a distance greater than the spacing between the sides to permit passage of such a wider object through said open end and mouth, and a transporting position spaced closer to said other side than in said loading position to preclude passage of such wider object through said open end and mouth.

5. The vehicle of claim 4 wherein the side and opening therein are located in a common predetermined plane extending longitudinally of the housing; wherein vertically spaced, vertically aligned upper and lower bearings are mounted on the housing at the mouth of the opening and substantially in said plane; and wherein the gate member is an elongated post having aligned, straight upper and lower end sections respectively journaled in the bearings and an intermediate offset section laterally offset from the end sections, said post being rotatable in the bearings between said vehicle loading position wherein the offset section is extended outwardly from said side in which the opening is located, and said vehicle transporting position wherein the offset section is located in said plane.

6. The vehicle of claim 4 including interengageable means on the post and on the housing for releasably holding the post in transporting position.

7. A vehicle for transporting objects and adapted for loading and unloading such objects on and off from the carrier comprising an elongated housing of rectangular cross-section including a lower chassis, side walls upstanding from the chassis, and a roof interconnecting the side walls, the chassis, side walls and roof circumscribing an elongated compartment and having opposite open ends leading into the compartment, said side walls having opposed transversely aligned openings therein, said openings providing a mouth at one of said open ends of the compartment and being extended inwardly of the side walls from said mouth, said opening being adapted to accommodate an object wider than the spacing between the side walls; a gate member mounted to each side wall adjacent to said mouth of the openings, and in spanning relation to the mouth for movement between a loading position spaced outwardly from said side walls to permit passage of such wider object through said open end and mouth, and a transporting position substantially in alignment with the respective side walls of the housing; means supporting the housing for earth-traversing movement longitudinally thereof; elongated rails supported on the roof in transversely spaced relation and extended longitudinally of the housing; elongated beams having opposite end portions; means individually longitudinally supporting the carriages on the rails for movement thereon longitudinally of the housing between a transporting position with the opposite end portions in inwardly adjacent spaced relation to the opposite ends of the housing, and loading and unloading positions with the opposite end portions of the carriages alternately extended out of their respectively adjacent ends of the housing; and pairs of longitudinally spaced slings transversely suspended between the carriages being adapted to receive an object for loading into and unloading from the compartment, there being a pair of slings in longitudinally spaced relation on each of the corresponding end portions of the carriages, and each pair of slings also being movable with the carriages between said loading and unloading positions suspended out of their respective ends of the housing and positions entirely within the housing.

8. The carrier of claim 7 including means borne by the side walls individually releasably connected to the carriages when the latter are located entirely within the compartment, said means being adapted to pull the carriages laterally of the housing, and including means releasably rigidly interconnecting the carriages with their respective adjacent side walls of the housing to preclude movement of the carriages longitudinally and laterally of the housing.

9. The carrier of claim 7 wherein the side walls meet the roof and chassis in upper and lower corners, and including flexible tension members releasably interconnecting diagonally related corners of the housing longitudinally thereof; and means mounted on said side walls of the housing engageably maintaining the tension members between relaxed and taut positions alternately unobstructing said compartment for loading and blocking said compartment to impart transverse stability to the housing.

10. A boat trailer comprising an elongated chassis having opposite end portions and opposite sides, means mounting the chassis for earth-traversing movement longitudinally of the chassis, side walls rigidly connected to the sides of the chassis and upwardly extended therefrom in transversely spaced relation, a roof rigidly interconnecting the walls in elevationally spaced relation to the chassis and having opposite, transversely extended, end edges, said chassis, walls and roof circumscribing an elongated compartment within the trailer having opposite open ends individually located at the opposite end portions of the chassis, said side walls having opposed transversely aligned openings therein, said openings providing a mouth at one of said open ends of the compartment and being extended inwardly of the side walls from said mouth, said opening being adapted to accommodate an object wider than the spacing between the side walls; a gate member mounted to each side wall adjacent to said mouth of the openings, and in spanning relation to the mouth for movement between a loading position spaced outwardly from said side walls to permit passage of such wider object through said open end and mouth, and a transporting position substantially in alignment with the respective side walls of the housing; elongated transversely spaced rails extended longitudinally of and supported by the roof within the compartment and having transverse webs at said opposite end edges of the roof, an elongated carriage including rollers supported on the rails for movement of the carriage longitudinally of the compartment between positions at opposite ends of the compartment with the rollers abutting the webs, the carriage having elongated opposite end portions respectively extended out of the opposite ends of the compartment when the carriage is in its opposite endmost positions, the carriage also having a central position with said opposite end portion respectively spaced inwardly of the housing from said opposite ends of the compartment, and slings connected in longitudinally spaced relation to the carriage and extended downwardly therefrom for supporting a boat therein and enabling loading and unloading of a boat on and off from the carriage at both ends of the trailer and movement of such boat into and out of both open ends of the compartment for positioning longitudinally of the compartment.

References Cited in the file of this patent
UNITED STATES PATENTS

| | | |
|---|---|---|
| 466,890 | Dean | Jan. 12, 1892 |
| 561,714 | Lynch | June 9, 1896 |
| 1,903,274 | Watson | Mar. 28, 1933 |
| 2,088,655 | King | Aug. 3, 1937 |
| 2,428,144 | Clough | Sept. 30, 1947 |
| 2,509,067 | Leach | May 23, 1950 |
| 2,692,056 | Woods | Oct. 19, 1954 |